(12) United States Patent
Chen

(10) Patent No.: US 8,047,057 B2
(45) Date of Patent: Nov. 1, 2011

(54) OUTPUT MODE SWITCHING APPARATUS

(75) Inventor: Ting-Kuang Chen, Keelung (TW)

(73) Assignee: Top Gearbox Industry Co., Ltd., Taoyuan County (TW)

( * ) Notice: Subject to any disclaimer, the term of this patent is extended or adjusted under 35 U.S.C. 154(b) by 32 days.

(21) Appl. No.: 12/775,721

(22) Filed: May 7, 2010

(65) Prior Publication Data

US 2010/0319945 A1 Dec. 23, 2010

(30) Foreign Application Priority Data

Jun. 17, 2009 (TW) ................................ 98210810 U

(51) Int. Cl.
*B25B 21/00* (2006.01)
*E02D 7/02* (2006.01)
*E21B 3/00* (2006.01)
*E21B 17/22* (2006.01)
*E21B 19/16* (2006.01)
*E21B 19/18* (2006.01)

(52) U.S. Cl. ............... 73/48; 173/47; 173/216; 173/217

(58) Field of Classification Search .............. 173/39–56, 173/13–21; 74/52, 423; 475/337, 75, 149
See application file for complete search history.

(56) References Cited

U.S. PATENT DOCUMENTS

| 6,338,404 | B1 | 1/2002 | Chen | |
|---|---|---|---|---|
| 6,715,562 | B1 | 4/2004 | Chen | |
| 7,124,839 | B2 * | 10/2006 | Furuta et al. | 173/104 |
| 7,308,948 | B2 * | 12/2007 | Furuta | 173/48 |
| 7,377,331 | B2 | 5/2008 | Chen | |
| 7,380,612 | B2 * | 6/2008 | Furuta | 173/29 |
| 7,380,613 | B2 * | 6/2008 | Furuta | 173/48 |
| 7,494,437 | B2 * | 2/2009 | Chen | 475/149 |
| 2007/0060440 | A1 * | 3/2007 | Lee | 475/337 |
| 2008/0167158 | A1 * | 7/2008 | Chen | 475/298 |
| 2010/0200257 | A1 * | 8/2010 | Scrimshaw et al. | 173/47 |
| 2010/0326686 | A1 * | 12/2010 | Leong et al. | 173/48 |

FOREIGN PATENT DOCUMENTS

GB 2396390 A * 6/2004

* cited by examiner

*Primary Examiner* — Rinaldi Rada
*Assistant Examiner* — Robert Long
(74) *Attorney, Agent, or Firm* — Rabin & Berdo, P.C.

(57) ABSTRACT

An output mode switching apparatus including a power unit, a hammering unit, an output shaft, a housing, and a shifting member is provided. The hammering unit includes a gasket cup, a switching ring, a spring member, a hammering seat, and a main shaft. When the power unit is not in operation, the switching ring is restricted so as to be positioned against and secured to the gasket cup. When the mains shaft is driven by the power unit to rotate, the hammering seat is carried to rotate and is applied with a restriction for restricting the hammering seat from axial movement, thus configuring an output mode of electric drill. When the shifting member is turned, the restriction applied to the hammering seat is released. The hammering blocks repetitively hammers the protrusion blocks and axially returns back to the original position, thus configuring an impact output mode.

4 Claims, 5 Drawing Sheets

OUTPUT MODE SWITCHING APPARATUS

BACKGROUND OF THE INVENTION

1. Field of the Invention

The present invention relates generally to an output mode switching apparatus adapted for switching between different output modes of an electric tool. In accordance with at least one of the output modes, the electric tool intermittently provides an impact output while continuously outputting a torque output.

2. The Prior Arts

A conventional structure of the electric tools such as electric drills or electric wrenches is typically featured with a structure for transmitting a driving power from a motor to an output shaft for achieving a speed variation (acceleration or deceleration). Further, in order to more tightly lock screws or more conveniently remove the tightly locked screws, some of the electric tools are also provided with an impact function. Such an electric tool is adapted for providing an impact on the screw at the moment of locking the screw, so as to more tightly lock the screw, or providing an impact on the screw at the moment of unscrew the screw to make it loose, so as to more conveniently remove the screw away.

Generally, a typical electric tool having an impact function includes a power unit, a transmission shaft, an intermediate shaft, a hammering seat and an output shaft. The power unit includes a motor, a first planetary gear set, a second planetary gear set, and a clutch mechanism. The clutch mechanism includes a clutch disk. When the clutch disk is axially moved to a first position, the electric tool is switched to a first output mode, in which the transmission shaft is coupled with the second planetary gear set, and the transmission shaft is engaged with the output shaft. In this case, the motor outputs a driving power via the first planetary gear set, the second planetary gear set, the transmission shaft, and the output shaft for continuously driving a tool bit to rotate with a low rotation speed. Correspondingly, the electric tool can be operated serving as an electric drill. Further, when the clutch disk is axially moved to a second position, the electric tool is switched to a second output mode, in which the transmission shaft is detached from second planetary gear set and the output shaft at the same time. In this case, the motor outputs the driving power via the first planetary gear set, the second planetary gear set, the transmission shaft, the intermediate shaft, the hammering seat, and the output shaft, for driving the tool kit to rotate with a high rotation speed and driving the tool kit to intermittently apply an impact. Correspondingly, the electric tool can be operated serving as an impact screw driver.

However, such an electric tool as discussed above further requires a switching apparatus for switching between the two output modes. Unfortunately such a switching apparatus is often complex and expensive.

SUMMARY OF THE INVENTION

A primary objective of the present invention is to provide an output mode switching apparatus adapted for switching between different output modes of an electric tool. The switching apparatus has relatively simple structure and a low cost.

The present invention provides an output mode switching apparatus adapted for switching between at least two output modes of an electric tool. The output mode switching apparatus includes a power unit, a hammering unit, an output shaft, a housing, and a shifting member.

The hammering unit includes a gasket cup, a switching ring, a spring member, a hammering seat, and a main shaft. The hammering seat includes a plurality of hammering blocks. The output shaft includes a plurality of protrusion blocks configured at a rear end of the output shaft. When the power unit is not in operation, the switching ring is restricted so as be positioned against and secured to the gasket cup. When the mains shaft is driven by the power unit to rotate, the hammering seat is carried to rotate and is applied with a restriction for restricting the hammering seat from axial movement, so that the hammering blocks are maintained to drive the protrusion block of the output shaft to rotate, thus configuring an output mode of electric drill. When the shifting member is turned, the restriction applied to the hammering seat is released. Hence, the hammering block can be driven to rotate clockwise or counterclockwise, and during which the hammering blocks repetitively hammers the protrusion block of the output shaft and axially returns back to the original position activated by the spring member. In such a way, an impact output mode is configured.

Specifically, the gasket cup has a peripheral edge configured with a plurality of dents. The switching ring has a first end and a second end. The first end and the second end of the switching ring are configured with a plurality of first protrusion portions, and a plurality of second protrusion portions, respectively. The second protrusion portions are configured in correspondence with the dents of the gasket cup and are adapted for matching therewith. The switching ring is further configured with an annular groove at an outer surface of an outer wall of the switching ring. The spring member is assembled between the gasket cup and the switching ring. The spring member has two ends set against the gasket cup and the switching ring, respectively. The hammering seat includes a hammering disk, and a plurality of hammering blocks. The hammering disk has an outer diameter greater than that of the hammering seat. The hammering blocks are configured on the hammering disk. The hammering disk is configured with a plurality of slots axially extending along an outer surface of an outer wall of the hammering disk. The slots are configured in accordance with the first protrusion portions for allowing the first protrusion portions entering therein. The hammering seat is further configured with a shaft hole at a center of the hammering seat. The shaft hole is configured with an inner V-shaped groove at an inner wall of the shaft hole. The main shaft is assembled through the gasket cup, the spring member, the switching ring, and the hammering seat. After being assembled through the gasket cup, the main shaft is allowed to axially move relative to the gasket cup, but is not allowed to rotate relative to the gasket cup. The main shaft is configured with an outer V-shaped groove at an outer surface of the main shaft. The inner V-shaped groove and the outer V-shaped groove are correspondingly positioned, and a plurality of steel balls are disposed between the inner V-shaped groove and the outer V-shaped groove for coupling the main shaft with the hammering seat. The main shaft is coupled with the power unit.

The housing includes a plurality of tilted slots. The output shaft and the hammering unit are sequentially assembled in the housing. The housing, together with the output shaft and the hammering unit, are then assembled in the shifting member. The shifting member has a sidewall, on which at least one slotted hole is configured. A sliding block is assembled to the slotted hole. The sliding block includes a protrusion edge and a latch. The protrusion edge and the latch are concentrically configured. The protrusion edge of the sliding block is coupled with the tilted slot of the housing, and the latch is inserted inside the annular groove for restricting the switching ring.

Preferably, the main shaft has one end having a polygonal cross-section, and the gasket cup is configured with a polygonal-shaped through hole at a center of the gasket cup corresponding to the polygonal cross-section of the main shaft for allowing the main shaft to be assembled therethrough, such that the main shaft and the gasket cup are allowed to axially move relative to each other, but are not allowed to rotate relative to each other.

According to an embodiment of the present invention, the power unit includes an output disk. The output disk is configured with a polygonal-shaped through hole at a center of the output disk. The polygonal-shaped through hole is configured in accordance with the polygonal cross-section of the main shaft for driving the main shaft to rotate with the output disk.

According to an embodiment of the present invention, the first protrusion portions and the second protrusion portions of the switching ring are formed by punching a sidewall of the switching ring toward a center of the switching ring. As such, the first protrusion portions and the second protrusion portion are protruded out from an inner wall of the switching ring. In such a way, when the switching ring is assembled with the hammering seat, the first protrusion portions and the second protrusion portions are correspondingly fitted in the slots of the hammering disk of the hammering seat, and the dents of the gasket cup, respectively.

In accordance with the foregoing discussed mechanism, when the power unit is not in operation, the switching ring is restricted by the sliding block, so that the second protrusion portions are restricted against the dents. When the main shaft is driven by the power unit to rotate, the driving power is transmitted via the hammering seat to the output shaft. The output shaft in operation carries the load, and is applied with a counter force. The counter force is transmitted back to the hammering seat to drive the hammering seat to reversely rotate. In accordance with the steel balls disposed between the outer V-shaped groove and the inner V-shaped groove, when the hammering seat is reversely rotated, the hammering seat axially moves toward the gasket cup, during which the slots of the hammering disk of the hammering seat are dislocated from the first protrusion portions so that the hammering seat is restricted from further axial movement. As such, the hammering blocks positioned at a front end of the hammering seat remain coupling with the protrusion blocks at the rear end of the output shaft. In this case, the driving power is continuously transmitted to the output shaft, thus configuring an electric drill output mode.

When the output mode switching apparatus is desired to be switched to an intermediate impact drill output mode, the shifting member is turned. Therefore, the sliding block is restricted by the tilted slot of the housing to move toward the first end, and accordingly carries the switching ring to move together. In such a way, the second protrusion portions of the second end of the switching ring detach from the dents of the gasket cup, while the first protrusion portions of the first end slide in the slots of the hammering seat. In this case, no matter the hammering seat rotates or reversely rotates, the switching ring synchronously rotates together with the hammering seat, except that the switching ring is restricted by the sliding block so that the switching ring cannot axially moves together with the hammering seat. Accordingly, when the hammering seat is reversely rotated activated by the counter force and moves toward the second end, the hammering seat is free of restriction. As such, the hammering blocks are allowed to leave the protrusion blocks at the rear end of the output shaft, and spring member applies a spring force on the hammering seat to return the hammering seat back to the original position. The operation is repetitively executed, thus configuring the desired intermediate impact output mode.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

Figure 1:
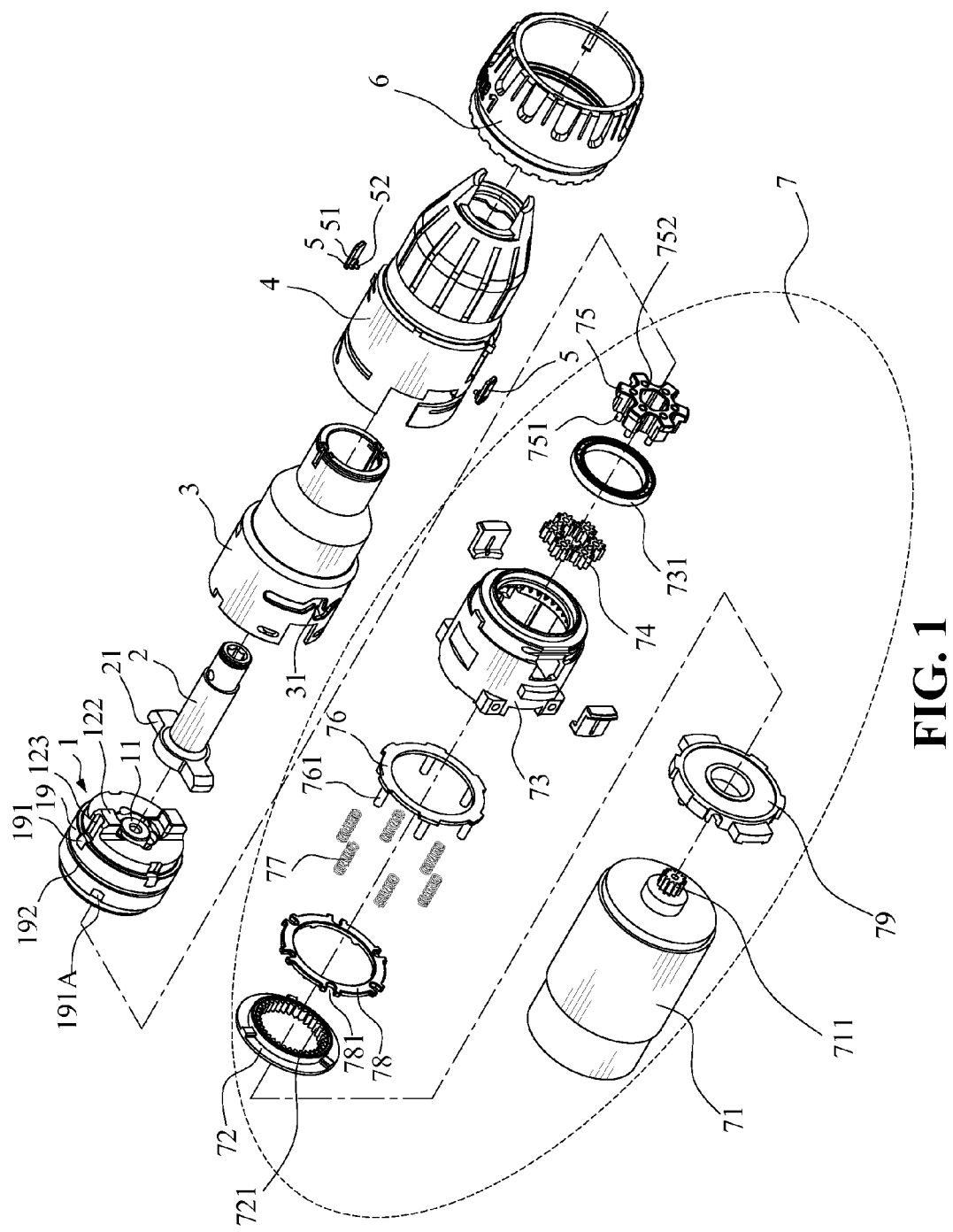
FIG. 1 is a perspective exploded view of an output mode switching apparatus according to an embodiment of the present invention.

The accompanying drawings are included to provide a further understanding of the invention, and are incorporated in and constitute a part of this specification. The drawing illustrates embodiments of the invention and, together with the description, serves to explain the principles of the invention.

FIG. 1 is a perspective exploded view of an output mode switching apparatus according to an embodiment of the present invention. The present invention provides an output mode switching apparatus adapted for switching between at least an electric drill output mode and an intermediate impact output mode of an electric tool. As shown in FIG. 1, the output mode switching apparatus includes a power unit 7, a hammering unit 1, an output shaft 2, a housing 3, a shifting member 4, a sliding block 5, and an external shield 6.

The power unit 7 includes a motor 71, a fixing plate 79, a socket 73, a gear plate 72, a ring plate 78, a plurality of little spring members 77, a ring member 76, a plurality of planetary gears 74, a bearing 731, and an output disk 75. The motor 71 includes a driving gear 711. The fixing plate 79 and the socket 73 are sequentially disposed at a front side of the motor 71 adjacent to the driving gear 711. The gear plate 72, the ring plate 78, the little spring members 77, the ring member 76, the planetary gears 74, the bearing 731, and the output disk 75 are sequentially received in the socket 73. The gear plate 72 is configured with a plurality of inward teeth 721. The planetary gears 74 are simultaneously meshed with the inward teeth 721 of the gear plate 72 and the driving gear 711. The ring member 76 includes a plurality of positioning latches 761 configured at one side of the ring member 76. The ring plate 78 is configured with a plurality of recesses 781 distributed at a periphery edge thereof. Each of the positioning latches 761 is assembled through a corresponding little spring member 77, and is then assembled through a corresponding recess 781 so that the corresponding little spring member 77 is supported against a side wall of the gear plate 72. The output disk 75 is coupled with the bearing 731 and assembled inside the socket 73, and is allowed to freely rotate therein. The output disk 75 is configured with a plurality of protrusion latches 751 at one side of the output disk 75. Each of the planetary gears 74 is configured with a central hole at a center thereof. The protrusion latches 751 are respectively assembled through the central holes of the planetary gears 74 for coupling with the planetary gears 74. The output disk 75 is configured with a polygonal shaped through hole 752 for assembling with the hammering unit 1.

The hammering unit 1 and the output shaft 2 are coupled together and received in the housing 3. Then, the housing 3, together with the hammering unit 1 and the output shaft 2 received therein, are assembled to the socket 73 of the power unit 7. In such a way, the hammering unit 1 and the power unit 7 are mechanically coupled together. Then, the shifting member 4 is assembled to the housing 3, and then the external shield 6 is assembled to the shifting member 4.

Figure 2:
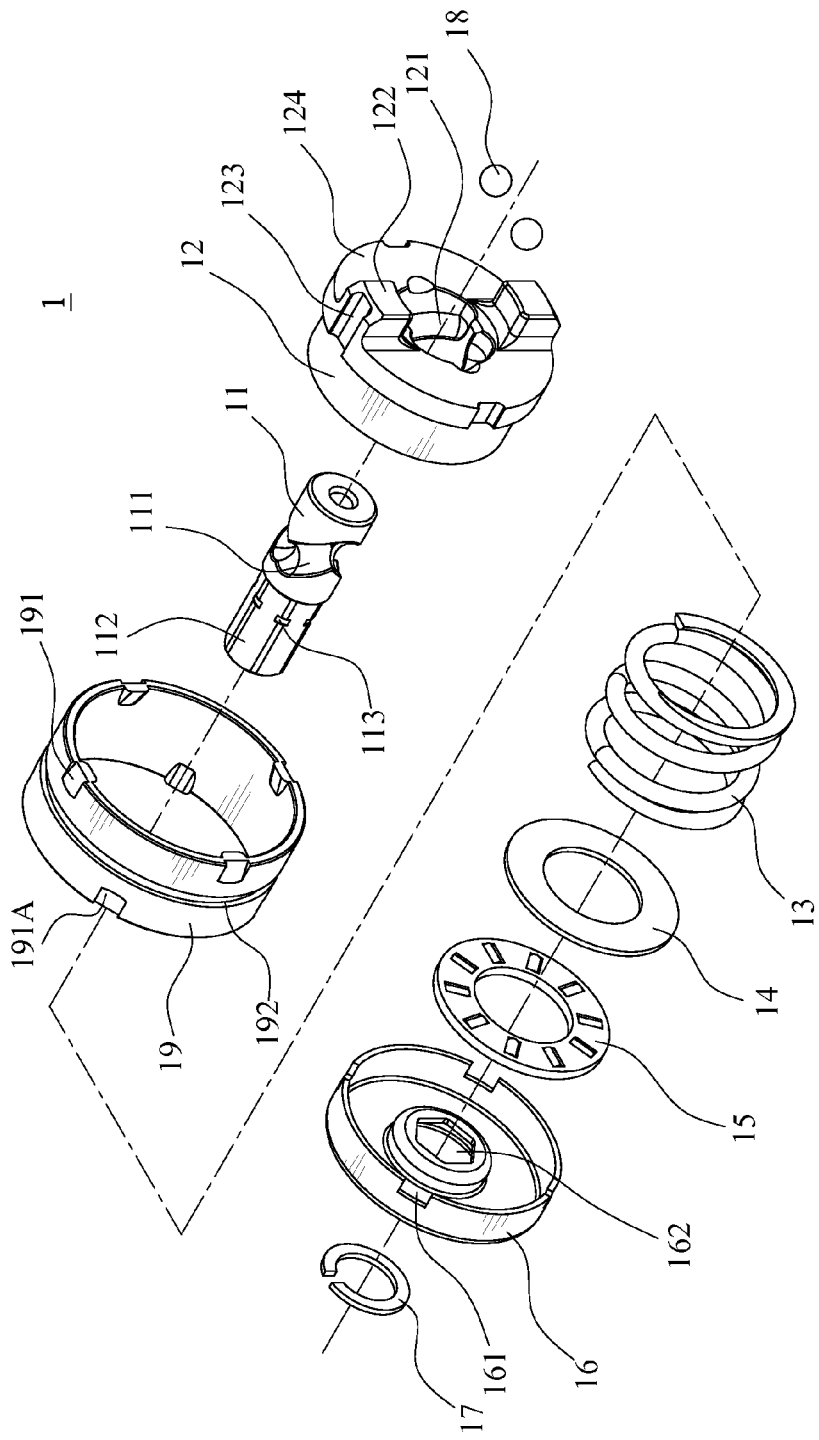
FIG. 2 is a perspective exploded view of a hammering unit according to an embodiment of the present invention.

FIG. 2 is a perspective exploded view of the hammering unit according to an embodiment of the present invention. Referring to FIG. 2, the hammering unit 1 includes a main shaft 11, a hammering seat 12, a spring member 13, a gasket 14, a thrust bearing 15, a gasket cup 16, a buckle ring 17, a plurality of steel balls 18, and a switching ring 19.

The main shaft 11 includes a first end and a second end. An outer V-shaped groove 111 is configured extending on an outer surface of the first end of the main shaft 11 and defining a V-shape thereon. The second end of the main shaft 11 has a polygonal shaped cross-section, thus serving as a polygonal shaft 112. A buckle groove 113 is configured on an outer surface of the polygonal shaft 112 by cutting a part therefrom.

The hammering seat 12 includes a hammering disk 124, and a plurality of hammering blocks 122. The hammering disk 124 has an outer diameter greater than that of the hammering seat 12. The hammering blocks 122 are configured on the hammering disk 124. The hammering disk 124 is configured with a plurality of slots 123 axially extending along an outer surface of an outer wall of the hammering disk 124. The steel balls 18 are disposed in the outer V-shaped groove 111, and then the main shaft 11 is assembled through the shaft hole of the hammering seat 12, so that the steel balls are positioned between the outer V-shaped groove 111 and the inner V-shaped groove 121. The steel balls 18 serve as a connection between the main shaft 11 and the hammering seat 12.

The gasket cup 16 is a tubular shaped member having a peripheral edge configured with a plurality of dents 161. The gasket cup 16 is configured with a polygonal shaped hole 162 at a center of the gasket cup 16 in accordance with the polygonal cross-section of the polygonal shaft 112.

The switching ring 19 is also a tubular shaped member having a first end and a second end opposite to each other. Each of the first end and the second end of the switching ring 19 includes a plurality of first protrusion portion 191, and a plurality of second protrusion portions 191A, respectively. Preferably, the first protrusion portions 191 and the second protrusion portions 191A of the switching ring 19 are formed by punching a sidewall of the switching ring 19 toward a center of the switching ring 19. As such, the first protrusion portions 191 and the second protrusion portions 191A are protruded out from an inner wall of the switching ring 19. In such a way, when the switching ring 19 is assembled with the hammering seat 12, the first protrusion portions 191 and the second protrusion portions 191A are correspondingly fitted in the slots 123 of the hammering seat 12, and the dents 161 of the gasket cup 16, respectively. The switching ring 19 is further configured with an annular groove 192 at an outer surface of an outer wall of the switching ring 19. The shifting member 4 has a sidewall, on which at least one slotted hole 41 is configured. The sliding block 5 includes a protrusion edge 51 and a latch 52. The protrusion edge 51 and the latch 52 are concentrically configured.

In assembling the hammering unit 1, at first, the thrust bearing 15, the gasket 14, and the spring member 13 are sequentially assembled in the gasket cup 16, and then the gasket cup 16 is assembled to the second end of the switching ring 19. Then, the main shaft 11 is assembled with the hammering seat 12 is assembled through the polygonal shaped hole 162 of the gasket cup 16. Then, the buckle ring 17 is buckled with the buckle groove 113 of the polygonal shaft 112 for preventing the main shaft 11 detaching from the gasket cup 16. The spring member 13 has two ends set against the gasket cup 16 and the hammering seat 12, respectively, thus configuring the hammering unit 1.

The hammering unit is assembled with the power unit 7 by assembling the polygonal shaft 112 of the second end of the main shaft 11 through the polygonal shaped hole 752 of the output disk 75. In such a way, the polygonal shaft 112 is allowed to axially move relative to the polygonal shaped hole 752, but is not allowed to rotate relative to the polygonal shaped hole 752.

The output shaft 2 and the hammering unit 1 are sequentially assembled in the housing 3, such that one side of the protrusion block 21 is positioned against the hammering blocks 122. Then, the housing 3 is assembled inside the shifting member 4. Then, the sliding block 5 is assembled to the slotted hole 41 of the shifting member 4, such that the protrusion edge 51 of the sliding block 5 is coupled with the tilted slot 31 of the housing 3, and the latch 52 is inserted inside the annular groove 192 of the switching ring 192.

Figure 3A:
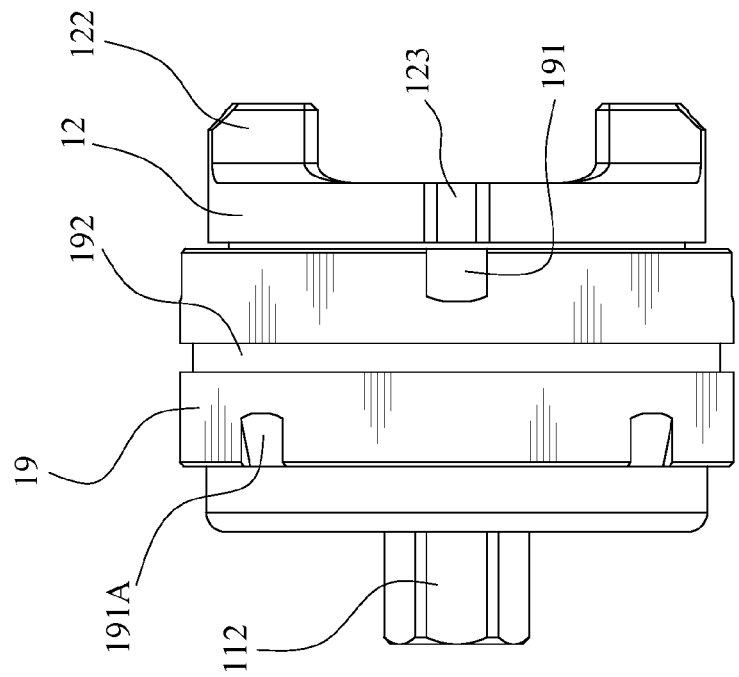
FIG. 3A is a side view of the hammering unit when the output mode switching apparatus is not driven in operation.
Figure 3:
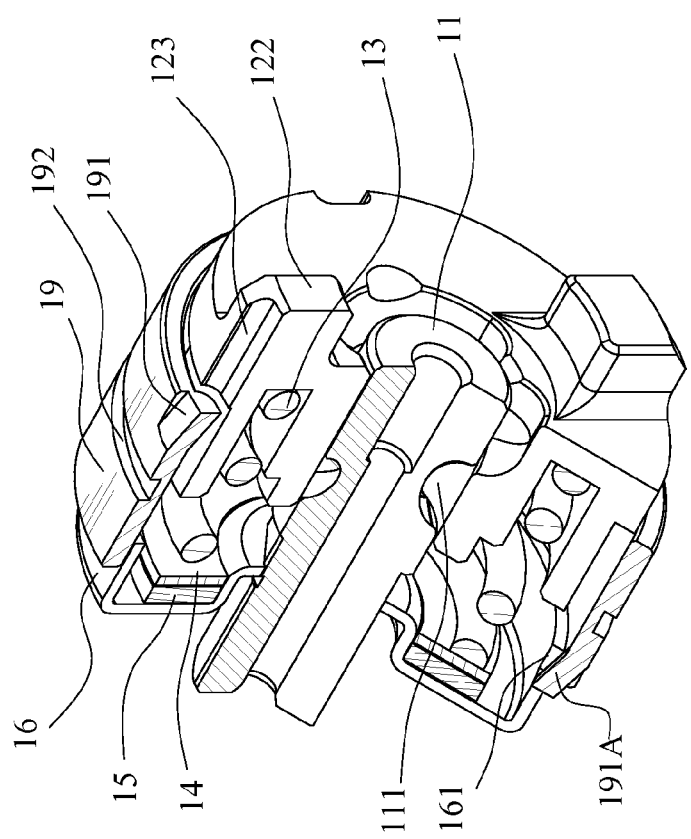
FIG. 3 is a perspective cross sectional view of the hammering unit when the output mode switching apparatus is not driven in operation.

FIG. 3 is a perspective cross sectional view of the hammering unit when the output mode switching apparatus is not driven in operation. FIG. 3A is a side view of the hammering unit when the output mode switching apparatus is not driven in operation. Referring to FIGS. 3 and 3A, when the power unit 7 is not in operation, the output mode switching apparatus is not in operation. In this case, the switching ring 19 is restricted by the sliding block 5, so that the second protrusion portions 191A are restricted against the dents 161 of the gasket cup 16.

Figure 4:
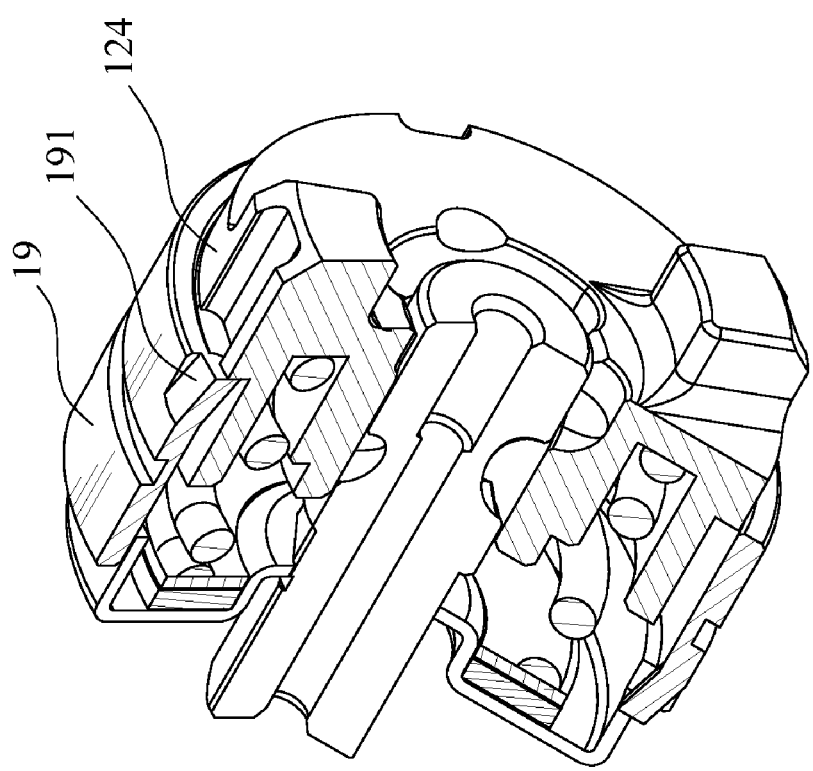
FIG. 4 is a perspective cross sectional view of the hammering unit when the output mode switching apparatus is driven with an electric drill output mode.

FIG. 4 is a perspective cross sectional view of the hammering unit when the output mode switching apparatus is driven with an electric drill output mode. As shown in FIG. 4, when the motor 71 is operated, the driving gear 71 carries the planetary gears 74 to run, and at the same time drives the output disk 75 to rotate. The output disk 75 drives the main shaft 11 to rotate. The main shaft 11 then carries the hammering seat 12 to rotate via the steel balls 18. The hammering blocks 122 then drives the protrusion block 21 to carry the output shaft 2 to rotate. The output shaft 2 in operation carries a load, and is applied with a counter force. The counter force is transmitted back to the hammering seat 12 to drive the hammering seat 12 to reversely rotate. In accordance with the steel balls 18 disposed between the outer V-shaped groove 111 and the inner V-shaped groove 121, when the hammering seat 12 is reversely rotated, the hammering seat 12 axially moves toward the gasket cup 16, during which the slots 123 of the hammering disk 124 of the hammering seat 12 are dislocated from the first protrusion portions so that the hammering seat 12 is restricted from further axial movement. As such, the hammering blocks 122 positioned at a front end of the hammering seat 12 remain coupling with the protrusion blocks 21 at the rear end of the output shaft 2. In this case, the driving power is continuously transmitted to the output shaft 2, thus configuring an electric drill output mode.

Figure 5A:
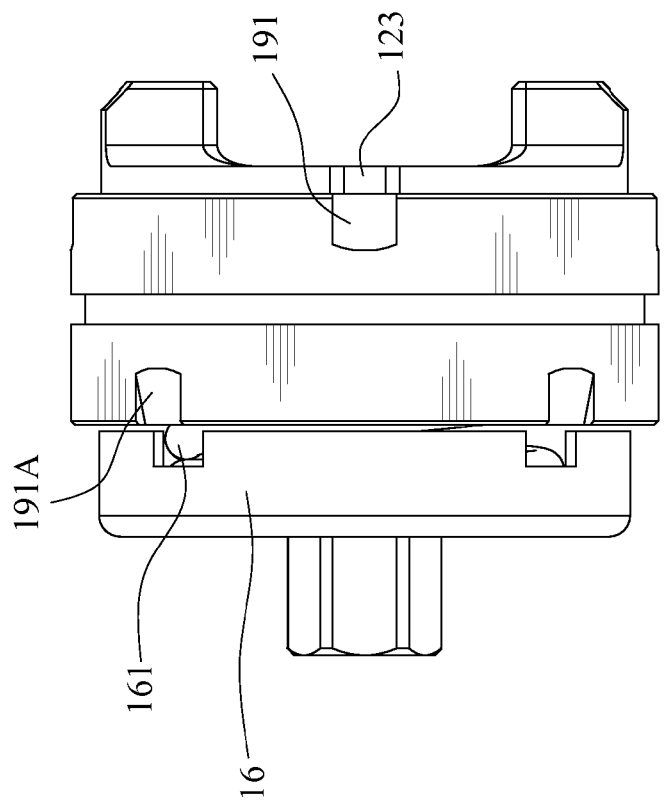
FIG. 5A a side view of the hammering unit when the output mode switching apparatus is driven with the intermediate impact output mode.
Figure 5:
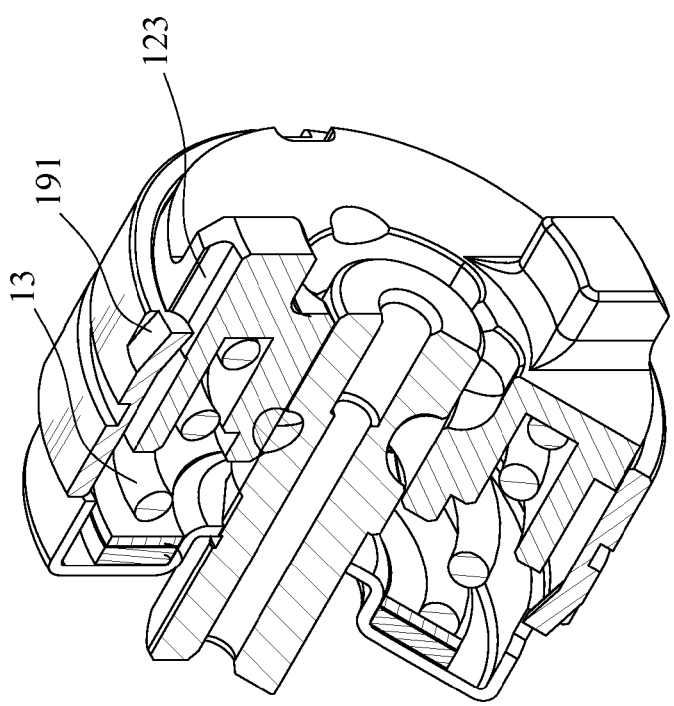
FIG. 5 is a perspective cross sectional view of the hammering unit when the output mode switching apparatus is driven with an intermediate impact output mode.

FIG. 5 is a perspective cross sectional view of the hammering unit when the output mode switching apparatus is driven with an intermediate impact output mode. FIG. 5A a side view of the hammering unit when the output mode switching apparatus is driven with the intermediate impact output mode.

Referring to FIGS. 5 and 5A, when the output mode switching apparatus is desired to be switched to an intermediate impact drill output mode, the shifting member 4 is turned, such that the sliding block 5 is restricted by the tilted slot 31 of the housing 3 to move toward the first end, and accordingly carries the switching ring 19 to move together. In such a way, the second protrusion portions 191A of the second end of the switching ring 19 detach from the dents 161 of the gasket cup 16, while the first protrusion portions 191 of the first end slide in the slots 123 of the hammering seat 12 as shown in FIGS. 5 and 5A. In this case, no matter the hammering seat 12 rotates or reversely rotates, the switching ring 19 synchronously rotates together with the hammering seat 12, except that the switching ring 19 is restricted by the sliding block 5 so that the switching ring 19 cannot axially moves together with the hammering seat 12. Accordingly, when the hammering seat 12 is reversely rotated activated by the counter force and moves toward the second end, the hammering seat 12 is free of restriction. As such, the hammering blocks 122 are allowed to leave the protrusion blocks 21 at the rear end of the output shaft 2, and spring member 13 applies a spring force on the hammering seat 12 to return the hammering seat 12 back to the original position. The operation is repetitively executed, thus configuring the desired intermediate impact output mode.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An output mode switching apparatus adapted for switching between at least two output modes of an electric tool, the output mode switching apparatus comprising:
    a power unit;
    a hammering unit, comprising:
        a gasket cup, having a peripheral edge configured with a plurality of dents;
        a switching ring, comprising a first end, a second end and an annular groove configured at an outer surface of an outer wall of the switching ring, wherein the first end and the second end of the switching ring are configured with a plurality of first protrusion portions, and a plurality of second protrusion portions, respectively, and the second protrusion portions are configured in correspondence with the dents of the gasket cup and are adapted for matching therewith;
        a spring member, having two ends set against the gasket cup and the switching ring, respectively;
        a hammering seat, having a shaft hole configured at a center of the hammering seat, an inner surface of the shaft hole having an inner V-shaped groove, the hammering seat comprising:
            a hammering disk having an outer diameter greater than that of the hammering seat, wherein the hammering disk is configured with a plurality of slots axially extending along an outer surface of an outer wall of the hammering disk, and the slots are configured in accordance with the first protrusion portions for allowing the first protrusion portions entering therein; and
            a plurality of hammering block disposed on the hammering disk; and
        a main shaft, assembled through the gasket cup, the spring member, the switching ring, and the hammering seat, wherein after being assembled through the gasket cup, the main shaft is allowed to axially move relative to the gasket cup, but is not restricted from rotation relative to the gasket cup, wherein the main shaft is configured with an outer V-shaped groove at an outer surface of the main shaft, wherein the inner V-shaped groove and the outer V-shaped groove are correspondingly positioned, and a plurality of steel balls are disposed between the inner V-shaped groove and the outer V-shaped groove for coupling the main shaft with the hammering seat, wherein the main shaft is coupled with the power unit;
    an output shaft, axially assembled with the hammering unit, wherein one end of the output shaft is configured with a plurality of protrusion blocks adapted for facilitating the hammering blocks for applying impact;
    a housing, adapted for receiving the hammering unit and being assembled through by the output shaft, wherein the housing is configured with a plurality of tilted slots at an sidewall thereof;
    a shifting member adapted for receiving the housing therein, wherein the shifting member has a sidewall, on which a plurality of slotted hole is configured; and
    a plurality of sliding blocks, wherein each of the sliding blocks comprising a protrusion edge and a latch, wherein the protrusion edge and the latch are concentrically configured, and the protrusion edge of the sliding block is coupled with a corresponding tilted slot of the housing, and the latch is inserted inside the annular groove of the switching ring.

2. The output mode switching apparatus as claimed in claim 1, wherein the main shaft has one end having a polygonal cross-section, and the gasket cup is configured with a polygonal-shaped through hole at a center of the gasket cup corresponding to the polygonal cross-section of the main shaft for allowing the main shaft to be assembled therethrough.

3. The output mode switching apparatus as claimed in claim 1, wherein the power unit comprises an output disk, and the output disk is configured with a polygonal-shaped through hole at a center of the output disk, and the polygonal-shaped through hole is configured in accordance with the polygonal cross-section of the main shaft.

4. The output mode switching apparatus as claimed in claim 1, wherein the first protrusion portions and the second protrusion portions of the switching ring are formed by punching a sidewall of the switching ring toward a center of the switching ring.

* * * * *